March 24, 1964  J. K. ROYLE  3,126,233
BEARINGS

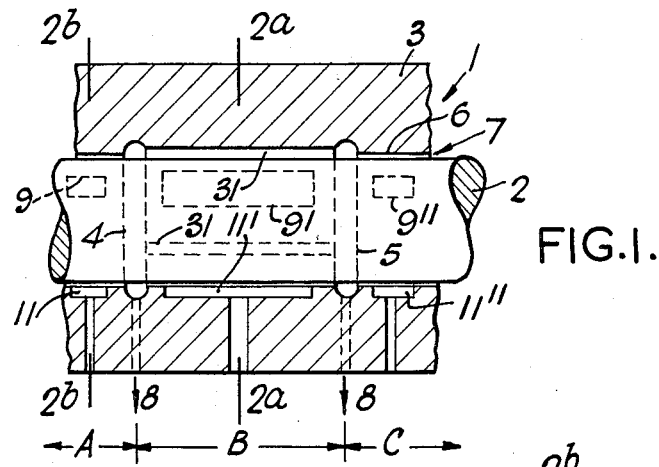
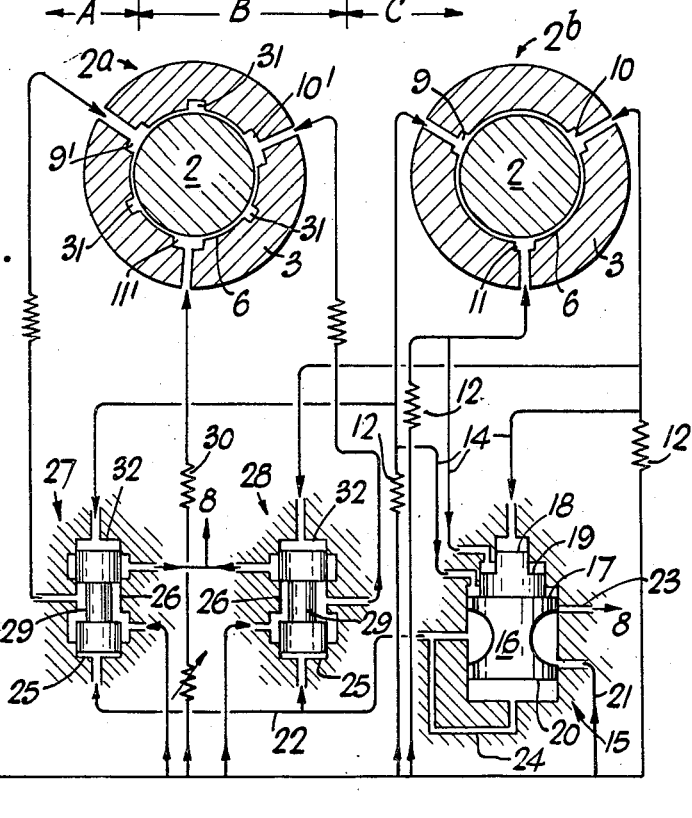

Filed June 13, 1961  2 Sheets-Sheet 2

United States Patent Office 3,126,233
Patented Mar. 24, 1964

3,126,233
BEARINGS
Joseph Kenneth Royle, Heaton Moor, Stockport, England, assignor to National Research Development Corporation, London, England, a British corporation
Filed June 13, 1961, Ser. No. 116,744
Claims priority, application Great Britain June 13, 1960
5 Claims. (Cl. 308—122)

This invention relates to bearings of the kind in which a movable member is held clear of a supporting structure by a film of fluid under pressure. While specially applicable to "cylindrical" bearings, in which a rod rotates within a cylindrical cavity in the supporting structure, the invention also applies, for instance, to flat sliding bearings in which a slab-like moving member is supported between opposed parts of the supporting structure.

According to this invention a bearing for supporting a movable member in a predetermined position within an enclosing structure, clear of the walls of that structure, by means of fluid under pressure has a plurality of fluid supply systems formed in the structure, each system comprising a main fluid supply orifice and a pilot fluid supply orifice, the systems being so situated that when the member moves away from one orifice of one system it moves towards the corresponding orifice in another system, means for permitting the escape, from the clearance space between the movable member and the structure, of fluid supplied to the main and pilot orifices of the bearing, means for sensing the clearance between individual pilot orifices and the movable member by the measurement of the resistance offered by the clearance to the escape of fluid from the individual pilot orifices, and means for relating the clearance at a pilot orifice to the pressure of the fluid within the corresponding main orifice so that variation of said clearance causes said pressure to vary in the opposite sense.

Preferably the clearance between individual pilot orifices and the movable member is sensed by using a restrictor in the fluid supply path to each orifice and by sensing the pressure at a point between each restrictor and the corresponding pilot orifice. This pressure will vary with the resistance to the escape of fluid from the pilot orifice.

Preferably the bearing is of the cylindrical type, and there are at least three fluid supply systems spaced symmetrically around the shaft. These comprise recesses formed in the structure and connected to sources of fluid under pressure. The main and pilot orifices of any one system are preferably in axial alignment with one another. It is also preferred that the fluid in one of the main orifices be maintained at a fixed pressure, the other main orifices being each related with the corresponding pilot orifice so that as the clearance between a pilot orifice and the movable member rises or falls the fluid pressure at the corresponding main orifice varies in the opposite sense.

Preferably means are provided for deriving the mean pressure of all the pressures acting at the individual pilot orifices and for controlling the fluid pressure at such of the main orifices as are maintained at variable pressure by fitting control valves into the fluid lines leading to these main orifices. The obturating member of the valve is urged to move in the closing direction by fluid at the said mean pressure and in the opening by fluid at the pressure of the fluid in the corresponding pilot orifice.

The preferred construction according to this invention will now be described by way of example with reference to the accompanying drawings, in which:

FIGURE 1 is a diagrammatic axial section through a "cylindrical" bearing,

FIGURE 2 is a diagrammatic view including sections taken on the lines $2a$—$2a$ and $2b$—$2b$ in FIGURE 1.

Figure 3:
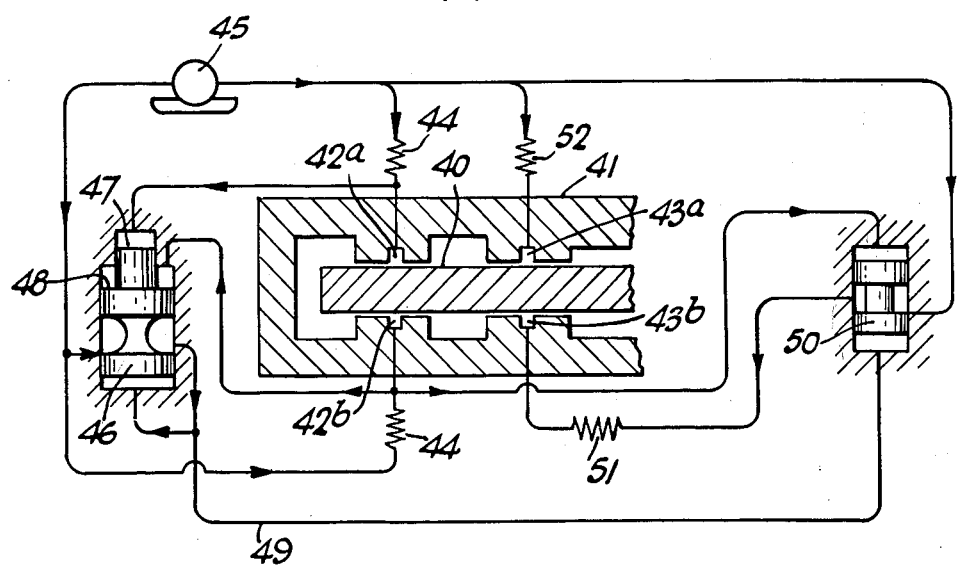
FIGURE 3 is a diagrammatic axial section through a flat sliding bearing.

A bearing 1 comprises a rod 2 supported rotatably within a supporting structure 3. The bearing 1 may be considered as being divided into three sections A, B and C, the boundaries between these sections being constituted by drain grooves 4 and 5, formed in the bearing wall 6 of the structure 3. Fluid is pumped into the clearance 7 between the rod 2 and the structure 3 through orifices formed in the wall 6, and this fluid escapes from the clearance 7 through either of the grooves 4 and 5, each of which communicates with a sump 8. The grooves also ensure that fluid supplied to the clearance within one section of the structure cannot overflow into another.

Three identical pilot orifices 9, 10 and 11 are formed in the wall 6 of the structure 3 within section A of the bearing, and are all symmetrical about a common plane lying perpendicular to the axis of the rod 2. The orifices 9, 10 and 11 are each connected through accurately equal resistances 12 to a common source 13 of fluid under pressure.

The orifices 9, 10 and 11 are also connected by conduits 14 with a mean pressure valve 15. This valve has a stepped piston 16, the areas of the three forward faces 17, 18 and 19 of this piston being equal. Face 17 is exposed to the fluid pressure at orifice 9, face 18 to that of orifice 10, and face 19 to that of orifice 11. The rear face 20 of the piston 16 has an area equal to the sum of the areas 17, 18 and 19. Thus, if the force acting against the rear face 20 of the piston is just sufficient to hold the piston still by balancing the sum of the forces acting on the faces 17, 18 and 19, then the pressure acting on face 18 must be the mean of the pressures acting on the three forward faces of the piston and therefore must be the mean of the pressures acting at the three orifices 9, 10 and 11. The piston 16 constitutes a valve member lying in a fluid line 21 leading from the source 13 either to a point of use through a line 22 or to the sump 8 by way of a line 23. A connection 24 brings the rear face 20 of the piston 16 into communication with the line 21, and the piston 16 therefore tends automatically to move to a position in which the forces on either side of it balance one another. Thus, the pressure of the fluid in line 24 and on face 20 is automatically maintained at the average of the pressures of the fluid at the three pilot orifices 9, 10 and 11.

The line 22 leads to the ends 25 of the cylinders 26 of control slide valves 27 and 28. The other ends 32 of the cylinders 26 are exposed to the fluid pressures existing at piolt orifices 9 and 10 respectively. Movement of the valve pistons 29 connects the line 21 either to the sump 8 or to main orifices 9' and 10' respectively. These orifices are formed in the area of the bearing wall 6 lying within section B of the bearing, and are aligned axially with pilot orifices 9 and 10 respectively. A third main orifice 11' is axially aligned with pilot orifice 11 but is connected to the source 13 through a damping resistance 30 instead of to the pilot orifice 11 by way of a control slide valve. Each main orifice and the correspondingly numbered pilot orifice constitutes a single fluid supply system according to the invention. In section B of the bearing the drain grooves 4 and 5 are connected by communicating drain grooves 31 lying parallel to the axis of the bearing and formed in the wall 6 between the main orifices 9', 10' and 11'. Thus it is ensured that fluid escaping from one of the main orifices is not impeded in its escape by fluid escaping from the others. The same precautions are not necessary in practice at the pilot orifices because these are smaller and the quantities of escaping fluid are less.

In section C of the bearing three balancing orifices 9", 10" and 11" are formed in the bearing wall 6. These are identical and are axially aligned with the corresponding pilot orifices 9, 10 and 11, and like them are connected to the source 13 through accurately equal resistances 12. Thus, the forces exerted on the rod by the fluid supplied to the pilot orifices are balanced by the forces exerted on the rod by fluid at the balancing orifices, and so are prevented from co-operating with the forces exerted by fluid at the main orifices in such a way as to exert a couple on the rod that would tend to tilt its axis relative to the axis of the structure 3.

So long as means are independently provided to maintain the axis of the rod parallel to the axis of the structure, and so long as the axis of the rod is prevented from wandering far from that of the structure, a bearing according to the present invention may be used to maintain the structure and the rod substantially co-axial. One bearing by itself is not suitable to counteract tilting of the rod within the structure. However, such tilting may be prevented, for instance, by mounting the rod in two bearings, each according to the invention and spaced some distance apart from one another. The rod will not then be able to tilt within one bearing without losing co-axiality with the housing within the other.

The method of working of the bearing will now be described.

Assume first that the bearing lies idle and is starved of fluid. The rod 2 rests under gravity against the wall 6, obstructing the orifices 11 and 11', but lying well clear of the orifices 9 and 9', 10 and 10'. The source 13 is now turned on, and fluid enters the three pilot orifices 9, 10 and 11. This fluid will escape easily to the drain groove 4 from the orifices 9 and 10, because there is a substantial clearance between them and the rod 2, but there will initially be great resistance to the escape of fluid from the pilot orifice 11 because it is blocked by the rod 2. Thus a high fluid pressure is created in the orifice 11, and comparatively low pressure in the orifices 9 and 10. These two low pressures will be communicated to the ends 32 of the cylinders 26, while the greater average pressure derived from the mean pressure valve 15 via the line 22 will be communicated to the ends 25 of these two cylinders. The valve pistons 29 as represented in FIGURE 1 will therefore both rise, causing fluid pressure in the main orifices 9' and 10' to fall relative to that in the orifice 11' which is supplied with fluid from the source 13 by way of the damping resistance 30. Thus the resultant effect of the fluid pressures acting on the rod at the three main orifices 9', 10' and 11' will be to lift the rod 2 off the wall 6 towards the position in which it lies coaxial with the structure 3. As it approaches this position, the pressures at the three pilot orifices will approach equality both to each other and, therefore, also to the average of the three of them. As this equality is first reached and then just passed, the pressures on opposite ends of the pistons 29 become equal, and then reverse, causing the pistons 27 and 28 to move towards the opposite ends of cylinders 26. Within section "B" of the bearing the rod will meanwhile have just overshoot the position of coaxility. The changing over of the pistons 29 will cause the rod to re-seek its correct position, and it will continue to oscillate about this position, with decreasing stroke, until the pistons 29 come to rest at some point intermediate the ends of the cylinders at which they pass fluid from the source 13 to the orifices 9' and 10' at such pressure as to balance the pressure in the orifice 11' and so hold the rod, when not under load, in its correct position. The damping resistances 30 minimise "hunting" when the rod is close to its correct position.

As FIGURES 1 and 2 show, the main orifices 9', 10' and 11' are longer axially and broader circumferentially than the pilot or balancing orifices. This feature is useful in a bearing where the shaft is to operate under a heavy but reasonably steady load. If, however, the load fluctuates but is never very great it may be desirable to increase the surface area of the pilot and balancing orifices so that rapid fluctuations of load do not cause the pilot orifices to exercise too jerky a control on the main ones.

If the direction of the external load on the bearing is uncertain, it may be desirable to use four fluid supply systems, equispaced around the circumference of the wall 6, instead of only three. In a flat sliding bearing the simplest use of the invention would involve two fluid supply systems, one on each side of the flat slab-like moving member, and directly opposite one another. Using this construction, it would be possible to ensure that the part of the moving member lying directly between the main orifices of the two systems always lay a predetermined distance from each of them. If independent means are provided to keep the face of the moving member parallel to a given plane, then by using two fluid supply systems of the invention, the face of the member may actually be kept in the desired plane. By using six fluid supply systems according to the invention, arranged three and three in triangular formation on opposite sides of the moving member, the member may be maintained with its face in one plane by means of these systems alone.

FIGURE 3 shows a flat sliding bearing according to the present invention. A flat slab-like moving member 40 slides within a supporting structure 41. Two pairs of bearing pads 42a and 42b, 43a and 43b, are formed in the structure 41, and the pressure fluid fed to them bears against the member 40. The pads 42a and 42b constitute a pilot pair and cooperate with the main load-carrying pair 43a and 43b. Both pads 42a and 42b are fed with fluid under pressure through identical resistances 44 from a source 45. The pressures at pads 42a and 42b are tapped and fed to bear against a piston 46. The faces 47, 48 of this piston are equal in area. The piston acts as a pressure-reducing valve which receives fluid direct from the source 45 and discharges it via a conduit 49 at a pressure equal to the mean of those pressures existing at pads 42a and 42b. The mean pressure is fed to bear against one end of a piston 50, and the pressure at pad 42b is fed to bear against the other end. The piston 50 acts as the member of a valve receiving fluid direct from the source 45 and discharging it via an arbitrary resistance 51 to the main pad 43b. Pad 43a receives fluid from the source 45 via another resistance 52.

Should the member 40 move out of its correct position mid-way between the two pads of bearings 42a, 42b and 43a, 43b, the mean of the pressures at pads 42a and 42b will become unequal to that at 42b alone. Therefore the two ends of piston 50 will be acted upon by unequal pressures and the piston will move so as to change the pressure of the fluid fed to the main pad 43b. This will tend to restore the proper clearance at the main bearing and then to over-restore, bringing about the movement of the piston 50 in the reverse direction. By a suitable choice of dimensions "hunting" can be minimized and the correct clearance at the main bearing effectively maintained within the required limits.

I claim:

1. A bearing for supporting a movable member in a predetermined position within an enclosing structure, clear of the walls of that structure, by means of fluid under pressure, comprising a plurality of fluid supply systems formed in the structure, each system comprising a main fluid supply orifice and a pilot fluid supply orifice, the systems being so supported that when the member moves away from one orifice of one system it moves towards the corresponding orifice in another system, means for permitting the escape, from the clearance space between the movable member and the structure, of fluid supplied to the main and pilot orifices of the bearing, in which the fluid in one of the main orifices is maintained at a fixed pressure, the other main orifices being each related with their corresponding pilot orifice so that as the clearance between a pilot orifice and the movable member rises or falls the fluid pressure at the corresponding main orifice varies in the opposite sense, in which there is a device for deriving the mean pressure of all the pressures acting at the individual pilot orifices and control valves are fitted in the fluid lines leading to such of the main orifices as are maintained at variable pressure, each of said control valves having obturating members urged to move in one direction by fluid at the said mean pressure and in the other direction by fluid at the pressure of the fluid in the corresponding pilot orifice.

2. A bearing according to claim 1, having a restrictor in the fluid supply path to each orifice, whereby the clearance between individual pilot orifices and the movable member varies as the pressure at a point between each restrictor and the corresponding pilot orifice.

3. A bearing according to claim 1 in which the main and pilot orifices of any one system are in axial alignment with one another.

4. A rod supported by two bearings each according to claim 1, the bearings being coaxial and spaced apart.

5. A bearing according to claim 1, the bearing being of the flat sliding type having a supporting structure in two parts adapted to support a flat slab-like moving member between them, and including two opposed fluid supply systems directly opposite one another, one on each part of the supporting structure.

References Cited in the file of this patent
UNITED STATES PATENTS

| | | |
|---|---|---|
| 2,692,803 | Gerard | Oct. 26, 1954 |
| 2,788,862 | Langer | Apr. 16, 1957 |